United States Patent
Lee et al.

(10) Patent No.: US 7,876,828 B2
(45) Date of Patent: Jan. 25, 2011

(54) METHOD, MEDIUM, AND APPARATUS PREDICTING DIRECT MODE MOTION OF A MULTI-ANGLE MOVING PICTURE

(75) Inventors: Yung-lyul Lee, Seoul (KR); Woo-chul Sung, Seoul (KR)

(73) Assignees: Sejong Industry-Academy Cooperation Foundation, Seoul (KR); Samsung Electronics Co., Ltd., Suwon-Si (KR)

( * ) Notice: Subject to any disclaimer, the term of this patent is extended or adjusted under 35 U.S.C. 154(b) by 1579 days.

(21) Appl. No.: 11/191,930

(22) Filed: Jul. 29, 2005

(65) Prior Publication Data

US 2006/0029137 A1 Feb. 9, 2006

(30) Foreign Application Priority Data

Aug. 3, 2004 (KR) .................. 10-2004-0061132

(51) Int. Cl.
*H04N 7/12* (2006.01)

(52) U.S. Cl. .................. 375/240.16; 375/240.12

(58) Field of Classification Search ............ 375/240.12, 375/240.16, 240.13, 240.24
See application file for complete search history.

(56) References Cited

U.S. PATENT DOCUMENTS

| | | | |
|---|---|---|---|
| 6,057,884 A | 5/2000 | Chen et al. | |
| 6,931,065 B2 * | 8/2005 | Kim | 375/240.16 |
| 7,558,321 B2 * | 7/2009 | Jeon | 375/240.16 |
| 2004/0001546 A1 | 1/2004 | Tourapis et al. | |
| 2005/0129114 A1 * | 6/2005 | Jeon | 375/240.12 |

FOREIGN PATENT DOCUMENTS

| | | |
|---|---|---|
| EP | 1406450 A1 | 4/2004 |
| EP | 1439713 A1 | 7/2004 |
| EP | 1450565 A1 | 8/2004 |
| JP | 2003-274415 | 9/2003 |
| JP | 16007563 | 1/2004 |
| JP | 16096705 | 3/2004 |
| JP | 2004088722 | 3/2004 |
| KR | 1999-6678 | 1/1999 |
| KR | 2003-37140 | 5/2003 |
| KR | 2003-83285 | 10/2003 |
| KR | 2004-31556 | 4/2004 |

OTHER PUBLICATIONS

International Search Report for PCT/KR2005/002465.

* cited by examiner

*Primary Examiner*—Gims S Philippe
(74) *Attorney, Agent, or Firm*—Staas & Halsey LLP

(57) ABSTRACT

A method, medium, and apparatus predicting direct mode motion of a multi-angle moving picture on a temporal and spatial basis. The method may include locating a block to which a co-located block of a block for which coding is sought makes reference with a motion vector, calculating a forward motion vector and a backward motion vector by making reference to pictures of an adjacent camera that exists in a direction parallel to a direction corresponding to the motion vector when a reference picture is not taken by the same camera as the picture to which the block for which coding is sought belongs, and calculating forward and backward reference blocks of the block for which coding is sought by applying weights to the calculated motion vectors. Therefore, the moving picture can be coded/decoded by locating motion vectors of previous and subsequent pictures without predicting motion, reducing calculation and performance time.

17 Claims, 6 Drawing Sheets

CENTER CAMRA

US 7,876,828 B2

METHOD, MEDIUM, AND APPARATUS PREDICTING DIRECT MODE MOTION OF A MULTI-ANGLE MOVING PICTURE

CROSS-REFERENCE TO RELATED APPLICATIONS

This application claims the benefit of Korean Patent Application No. 10-2004-0061132, filed on Aug. 3, 2004, in the Korean Intellectual Property Office, the disclosure of which is incorporated herein in its entirety by reference.

BACKGROUND OF THE INVENTION

1. Field of the Invention

Embodiments of the present invention relate to moving picture coding and/or decoding, and more particularly, to a method, medium, and apparatus predicting direct mode motion of a multi-angle moving picture on a temporal and spatial basis.

2. Description of the Related Art

MPEG-4 and H.264 moving picture coding has been used to code a moving picture taken by a single camera, with such standards focusing in large part on improvements in coding efficiency. However, in real communications or virtual reality, a single scene may be taken using a plurality of cameras, in order to form a moving picture from a plurality of angles, and thus a method, medium, and apparatus coding and decoding such a moving picture has become necessary.

MPEG (Moving picture Experts Group), which is a group of standards used for moving picture coding and decoding, has attempted to establish a standard for 3-dimensional audio/video coding by conducting a search for a standardization by organizing 3-D AV coding AHG (Ad-hoc Group) relating to 3-dimensional video coding and transmission. Thus, presently, a multi-angle 3-dimensional moving picture coding has not yet been standardized.

SUMMARY OF THE INVENTION

Embodiments of the present invention set forth a method, medium, and apparatus calculating a motion vector and a reference block for each block of a B picture included in a multi-angle moving picture.

To achieve the above and/or other aspects and advantages, embodiments of the present invention may include a method of predicting direct mode motion of a block in a multi-angle moving picture, including locating a block to which a co-located block, of the block for which coding is sought, makes reference with a motion vector, calculating a forward motion vector and/or a backward motion vector for the block for which coding is sought by making reference to a picture of an adjacent camera that exists in a direction parallel to a direction corresponding to the motion vector, when the reference picture is not taken by a same camera as a picture of the block for which coding is sought, and calculating forward and backward reference blocks of the block for which coding is sought by applying weighting to the calculated motion vectors.

The block to which the co-located block makes reference with the motion vector may be temporally previous to the co-located block and the block for which coding is sought. In addition, the co-located block may be temporally subsequent to the block for which coding is sought.

The calculating of the forward motion vector and/or the backward motion vector may be performed, when the reference picture is taken by the same camera as the picture for the block for which coding is sought, by predicting direct mode motion according to:

$$MV_0 = \frac{TD_B}{TD_D} MV_C, \quad MV_1 = \frac{TD_D - TD_B}{TD_D} MV_C,$$

wherein $MV_C$ denotes the motion vector, $TD_B$ denotes a distance from a B picture, of the block for which coding is sought, to a P picture of the co-located block, and $TD_D$ denotes a distance from a P picture of the block to which the co-located block makes reference with the motion vector to the P picture of the co-located block.

Further, weighting may be based on how far the reference picture is away from the camera that took the picture of the block for which coding is sought.

When a P picture ($f(j,t)$) taken by a $j^{th}$ camera at a time t makes reference to a picture ($f(j-1,t-3)$) taken by a $(j-1)^{th}$ camera at a time t−3, and a picture to which a B picture taken immediately before the P picture makes forward reference exists between the picture taken by the $(j-1)^{th}$ camera at the time t−3 and a picture ($f(j,t-3)$) taken by the $j^{th}$ camera at the time t−3, the forward motion vector may given by:

$$MV_{F1} = MV_C \frac{TD_B}{TD_D} c_{f(j-1,t-3)}, \quad MV_{F2} = MV_C \frac{TD_B}{TD_D} c_{f(j,t-3)},$$

where $TD_B$ indicates a distance between the B picture and the picture taken by the $j^{th}$ camera at the time t−3, $TD_D$ indicates a distance between the P picture and the picture taken by the $j^{th}$ camera at the time t−3, $MV|_{f(j-1,\,t-3)}$ indicates a motion vector calculated by making reference to the picture taken by the $j-1^{th}$ camera at the time t−3 and C is a weight value, with reference pictures of the forward motion vectors $MV_{F1}$ and $MV_{F2}$ being $R_{F1}$ and $R_{F2}$, respectively, a forward reference picture is given by $R_F = (3R_{F1}+R_{F2}+2)/4$.

When a P picture ($f(j,t)$) taken by a $j^{th}$ camera at a time t makes reference to a picture ($f(j-1,t-3)$) taken by a $(j-1)^{th}$ camera at a time t−3, and a picture to which a B picture taken immediately before the P picture makes forward reference exists between the picture taken by the $(j-1)^{th}$ camera at the time t−3 and a picture ($f(j,t-3)$) taken by the $j^{th}$ camera at the time t−3, the backward motion vector is given by:

$$MV_{B1} = MV_C \frac{TD_B - TD_D}{TD_D} c_{f(j,t)}, \quad MV_{B2} = MV_C \frac{TD_B - TD_D}{TD_D} c_{f(j+1,t)},$$

where $TD_B$ indicates a distance between the B picture and the picture taken by the $j^{th}$ camera at the time t−3, $TD_D$ indicates a distance between the P picture and the picture taken by the $j^{th}$ camera at the time t−3, $MV|_{f(j,t)}$ indicates a motion vector calculated by making reference to the picture taken by the $j^{th}$ camera at the time t, and C is a weight value, with reference pictures of the backward motion vectors $MV_{B1}$ and $MV_{B2}$ being $R_{B1}$ and $R_{B2}$, respectively, a backward reference picture is given by $R_B = (3R_{B1}+R_{B2}+2)/4$.

To achieve the above and/or other aspects and advantages, embodiments of the present invention may include an apparatus for predicting direct mode motion of a block in a multi-angle moving picture, the apparatus may include a determiner locating a block to which a co-located block, of the block for which coding is sought, makes reference with a motion vector, a motion vector calculator calculating a forward motion vector and/or a backward motion vector for the block for which coding is sought by making reference to a picture of an adjacent camera that exists in a direction parallel to a direction corresponding to the motion vector, when a reference picture is not taken by a same camera as a picture of the block for which coding is sought, and a reference picture calculator calculating forward and backward reference blocks of the block for which coding is sought by applying weighting to the calculated motion vectors.

Here, the apparatus may be a coding and/or decoding apparatus coding and/or decoding the moving picture. In addition, the coding and/or decoding apparatus may correspond to 3-dimensional video coding/decoding.

To achieve the above and/or other aspects and advantages, embodiments of the present invention may include at least one medium including computer readable code/instructions implementing embodiments of the present invention.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
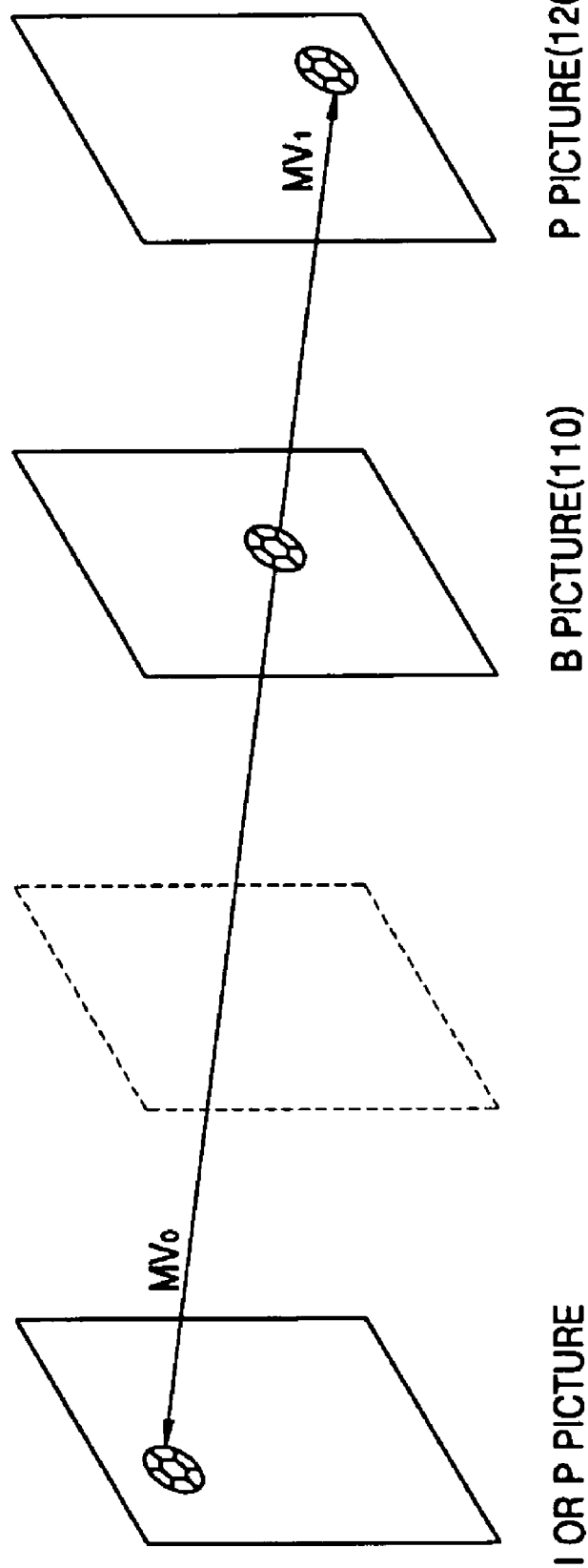
FIG. 1 illustrates how a motion vector of a B picture can be calculated.

Reference will now be made in detail to embodiments of the present invention, examples of which are illustrated in the accompanying drawings, wherein like reference numerals refer to the like elements throughout. The embodiments are described below to explain the present invention by referring to the figures.

FIG. 1 illustrates how a motion vector of a B picture 110 may be calculated. As illustrated, when a soccer ball moves from an upper left region to a lower right region of a screen in a soccer game. Each frame may be called a picture. A moving picture can include I pictures, B pictures, and P pictures, in an IBBPBBP configuration or an IBPBPBP configuration. Each of the B pictures can be used to predict motion for coding according to one of 5 modes, including a forward prediction mode, a backward prediction mode, a bidirectional prediction mode, a direct prediction mode, and an intra prediction mode. In the direct prediction mode, motion of a block of the B picture 110, for which coding is presently sought, can be predicted based on a motion vector of a co-located block of a P picture 120, which is a temporally subsequent picture, being used to obtain a forward motion vector $MV_0$ and a backward motion vector $MV_1$.

Figure 2:
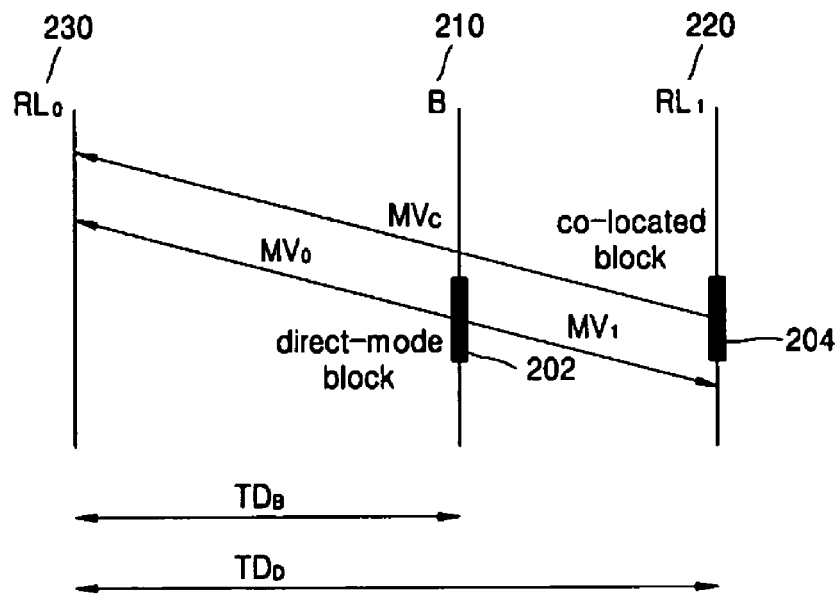
FIG. 2 illustrates a direct prediction mode for a B picture.

FIG. 2 illustrates a direct prediction mode of the B picture 210. In order to calculate the forward motion vector $MV_0$ and the backward motion vector $MV_1$ of a direct mode block 202, for which motion prediction is sought, in the B picture 210, the forward motion vector $MV_C$ is located as to a reference list 0 ($RL_0$) picture 230, to which a co-located block 204 makes reference, by a motion vector located in the same location in a reference list 1 ($RL_1$) picture 220, which is a temporally subsequent picture, as the direct mode block 202 in the B picture 210. The forward motion vector $MV_0$ and the backward motion vector $MV_1$ of the direct mode block 202 of the B picture 210 can be represented by Equation 1, as follows.

$$MV_0 = \frac{TD_B}{TD_D} MV_C, \quad MV_1 = \frac{TD_D - TD_B}{TD_D} MV_C \qquad \text{Equation 1}$$

Here, $MV_C$ denotes a motion vector of the co-located block 204 of the reference list 1 ($RL_1$) picture 220, $TD_B$ denotes the distance from the B picture 210 to the reference list 0 ($RL_0$) picture 230, and $TD_D$ denotes the distance from the reference list 0 ($RL_0$) picture 230 to the reference list 1 ($RL_1$) picture 220.

Figure 3A:
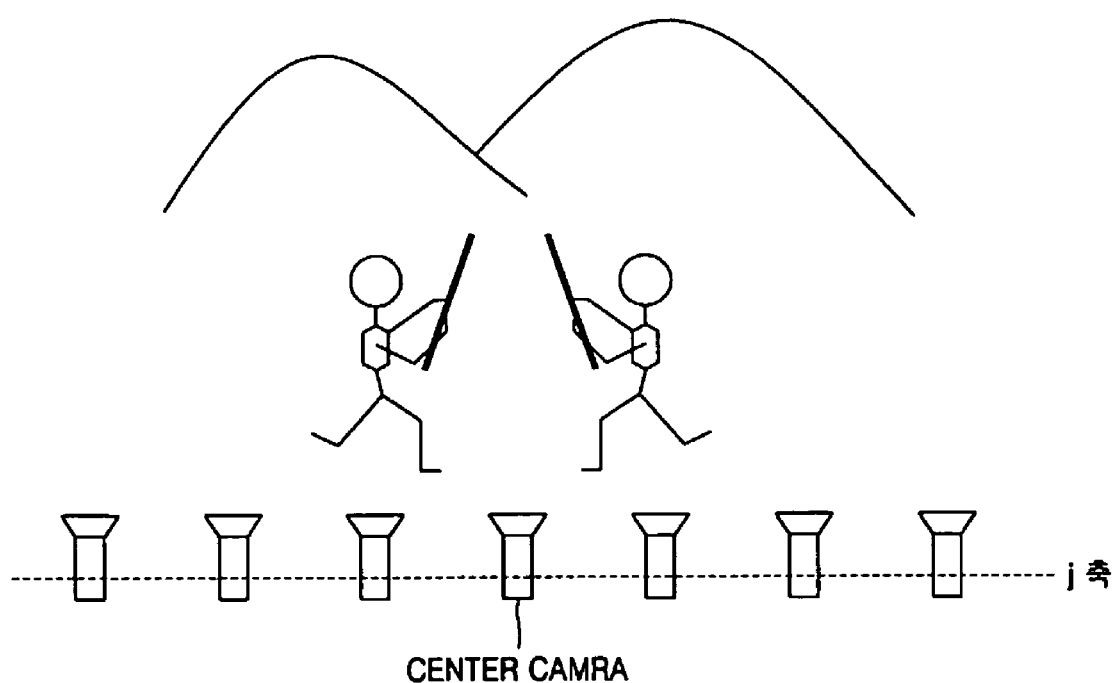
FIG. 3A illustrates locations of cameras that may be used to obtain a multi-angle moving picture, according to an embodiment of the present invention.

FIG. 3A illustrates locations of cameras that may be used to obtain a multi-angle moving picture. Referring to FIG. 3A, in this embodiment, the plurality of cameras are arranged along a j-axis. Such an arrangement of the cameras can be used to obtain a moving picture when a single scene is taken from several angles.

Figure 3B:
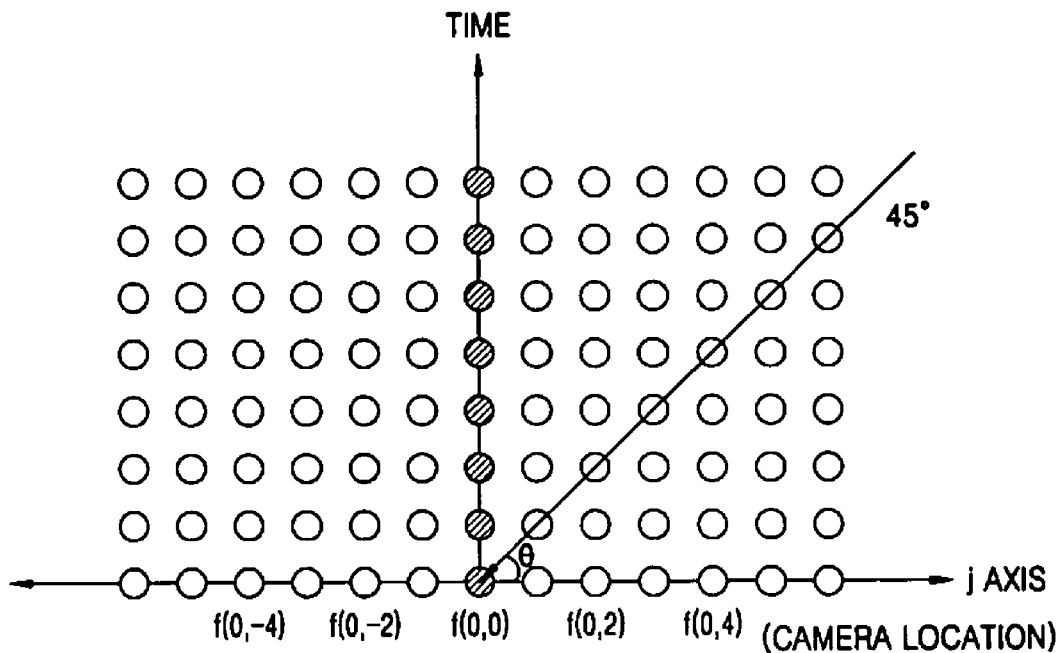
FIG. 3B illustrates pictures taken by a plurality of cameras for obtaining a multi-angle moving picture with respect to time.

FIG. 3B illustrates pictures taken by cameras for obtaining a multi-angle moving picture, with respect to time. If a picture taken by a camera at location j and time t is f(j,t), then, for example, f(0,0) can correspond to a picture taken by a camera at a center location at a beginning of a recording. Pictures taken by each of the cameras have been arranged along the time axis, with an angle θ between a line extending from a current frame in a camera to a subsequent frame in an adjacent camera and the j-axis. As illustrated, the units of the j-axis may correspond to a separation between cameras, the time axis may correspond to units of time intervals between subsequent pictures, and the angle θ may be 45°, noting that embodiments of the present invention are not limited thereto.

Figure 4:
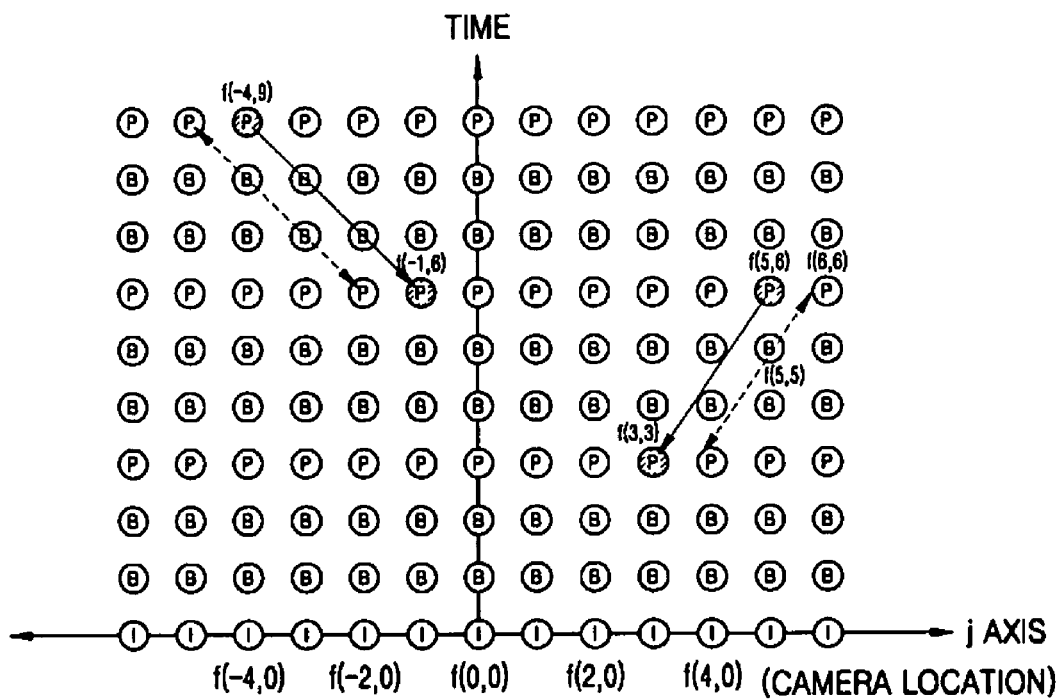
FIG. 4 is a graph illustrating a direct mode of a multi-angle moving picture, according to an embodiment of the present invention.

FIG. 4 is a graph illustrating a direct prediction mode of a multi-angle moving picture, according to an embodiment of the present invention. The aforementioned method of predicting direct mode motion, as described with reference to FIG. 2, may be used only when a reference picture indicated by the motion vector f(5,6), taken subsequently by the same camera that had taken f(5,5), is a picture that exists on the same j axis as the f(5,5) picture when predicting motion of the f(5,5). However, in the case of a multi-angle moving picture, a reference picture indicated by the motion vector of f(5,6), is not necessarily a picture taken by the same camera as f(5,5), and may be f(3,3), for example. In this case, the reference picture of f(5,5) should be predicted toward f(3,3), and toward f(6,6). Likewise, when a reference picture of f(-4,9) taken by a different camera is f(-1,6), the direct prediction mode described with reference to FIG. 2 may not be used, and a motion vector calculated by the direct prediction mode should be predicted toward f(-1,6), which is a reference picture indicated by f(-4,9).

According to an embodiment of the present invention, a method of applying a direct mode in a multi-angle moving picture will now be described in greater detail. A change in camera distance to change in time $\Delta j/\Delta t$ can be calculated based on the picture to which a co-located block of a subsequent picture of the B picture, for which the motion prediction is sought, makes reference. Calculation of the motion vector will now be described for four cases below according to the calculated $\Delta j/\Delta t$ values.

First, in the case where $\Delta j\Delta t=0$, since f(j,t) would have been taken by the same camera as a reference picture, the forward motion vector $MV_0$ and the backward motion vector $MV_1$ can be calculated using Equation 1 above.

Figure 5A:
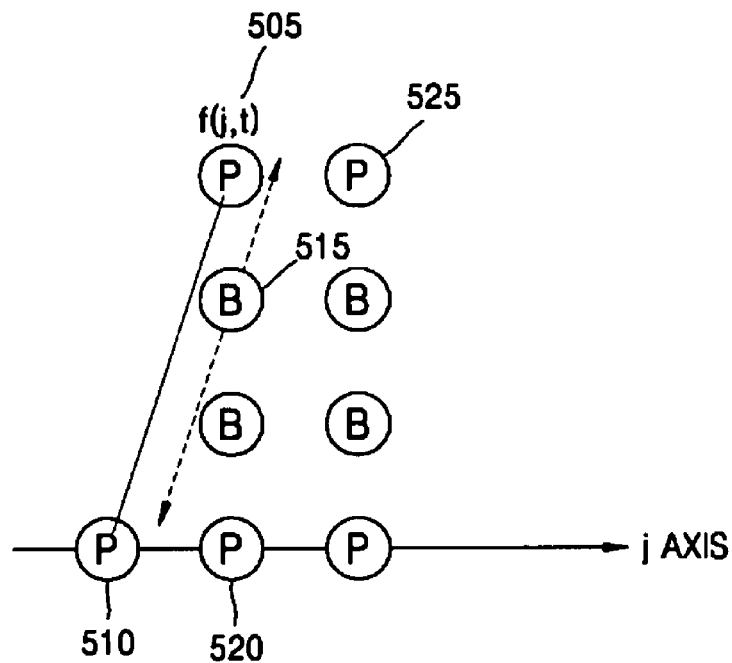
FIG. 5A is a graph illustrating direct prediction when a motion vector direction based on a change in camera distance to change in time $\Delta j/\Delta t$ of 1/3, according to an embodiment of the present invention.

As only an example, FIG. 5A illustrates direct prediction when ($\Delta j/\Delta t$ is ⅓, according to an embodiment of the present invention. Referring to FIG. 5A, f(j,t) 505, which is a P picture, makes reference to f(j-1,t-3) 510 taken by a (j-1)$^{th}$ camera. It can be thus seen that a picture to which a B picture 515 makes forward reference exists between f(j-1,t-3) 510 and f(j,t-3) 520, and is spatially much closer to and more similar to f(j-1,t-3) 510. That is, since a picture does not exist between f(j-1,t-3) 510 and f(j,t-3) 520, the respective motion vectors of f(j-1,t-3) 510 and f(j,t-3) 520 may be predicted.

Here, forward motion vectors $MV_{F1}$ and $MV_{F2}$ make reference to f(j-1,t-3) 510 and f(j,t-3) 520, respectively, and can be predicted by Equation 2, below.

$$MV_{F1} = MV_C \frac{TD_B}{TD_D} c_{f(j-1,t-3)}, \quad MV_{F2} = MV_C \frac{TD_B}{TD_D} c_{f(j,t-3)} \quad \text{Equation 2}$$

Here, $TD_B$ indicates the distance between the B picture 515 and f(j,t-3) 520, and $TD_D$ indicates the distance between the f(j,t) 505 and f(j,t-3) 520. If reference pictures of $MV_{F1}$ and $MV_{F2}$ are considered $R_{F1}$ and $R_{F2}$, respectively, a forward reference picture $R_F$ is given by $(3R_{F1}+R_{F2}+2)/4$. The weight of 3 may be given to $R_{F1}$ since it is spatially closer to the reference picture of $MV_{F1}$. $C_{f(j-1,t-3)}$, for example, is a weighting designated for f(j-1,t-3).

Likewise, it can be seen that a picture to which the B picture 515 makes backward reference exists between f(j,t) 505 and f(j+1,t) 525, and may be spatially much closer to and more similar to f(j,t) 505.

Backward motion vectors $MV_{B1}$ and $MV_{B2}$ make reference to f(j,t) 505 and f(j+1, t) 525, respectively, and can be predicted by Equation 3, below.

$$MV_{B1} = MV_C \frac{TD_B - TD_D}{TD_D} c_{f(j,t)}, \quad \text{Equation 3}$$

$$MV_{B2} = MV_C \frac{TD_B - TD_D}{TD_D} c_{f(j+1,t)}$$

If reference pictures of $MV_{B1}$ and $MV_{B2}$ are considered $R_{B1}$ and $R_{B2}$, respectively, a backward reference picture $R_B$ may be given by $(3R_{B1}+R_{B2}+2)/4$, for example.

Figure 5B:
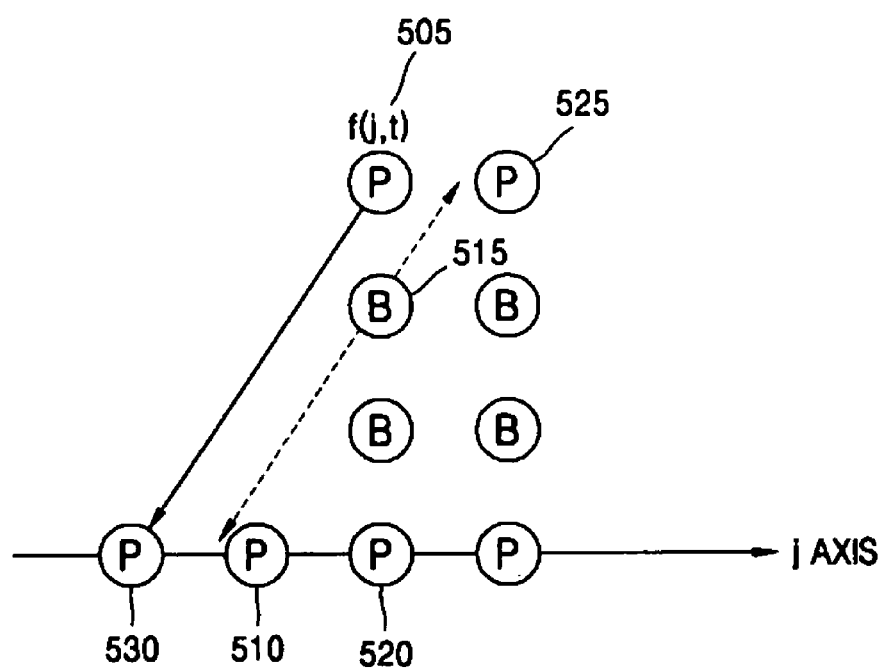
FIG. 5B is a graph illustrating direct prediction when a motion vector direction based on a change in camera distance to change in time $\Delta j/\Delta t$ of 2/3, according to an embodiment of the present invention.

According to another embodiment of the present invention, FIG. 5B illustrates direct prediction when $\Delta j/\Delta t$ is ⅔. Referring to FIG. 5B, f(j,t) 505 makes reference to f(j-2,t-3) 530, taken by a (j-2)$^{th}$ camera. It can be thus seen that a picture to which the B picture 515 makes forward reference exists between f(j-2,t-3) 530 and f(j-1,t-3) 510, and may be spatially much closer to and more similar to f(j-2,t-3) 530, for example.

Forward motion vectors $MV_{F1}$ and $MV_{F2}$ make reference to f(j-2,t-3) 530 and f(j-1,t-3) 510, respectively, and can be predicted by Equation 4, for example.

$$MV_{F1} = MV_C \frac{TD_B}{TD_D} c_{f(j-2,t-3)}, \quad MV_{F2} = MV_C \frac{TD_B}{TD_D} c_{f(j-1,t-3)} \quad \text{Equation 4}$$

If reference pictures of $MV_{F1}$ and $MV_{F2}$ are considered $R_{F1}$ and $R_{F2}$, respectively, a forward reference picture $R_F$ may be given by $(R_{F1}+3R_{F2}+2)/4$. The weight of 3 can be given to $R_{F2}$ since it is spatially closer to the reference picture of $MV_{F2}$, for example Likewise, a picture to which the B picture 515 makes backward reference exists between f(j,t) 505 and f(j+1,t) 525, and may be spatially much closer to and more similar to f(j+1,t) 525.

Accordingly, backward motion vectors $MV_{B1}$ and $MV_{B2}$ make reference to f(j,t) 505 and f(j+1,t) 525, respectively, and can be predicted by Equation 5, below.

$$MV_{B1} = MV_C \frac{TD_B - TD_D}{TD_D} c_{f(j,t)}, \quad \text{Equation 5}$$

$$MV_{B2} = MV_C \frac{TD_B - TD_D}{TD_D} c_{f(j+1,t)}$$

If reference pictures of $MV_{B1}$ and $MV_{B2}$ are considered $R_{B1}$ and $R_{B2}$, respectively, a backward reference picture $R_B$ may be given by $(R_{B1}+3R_{B2}+2)/4$, for example.

Figure 5C:
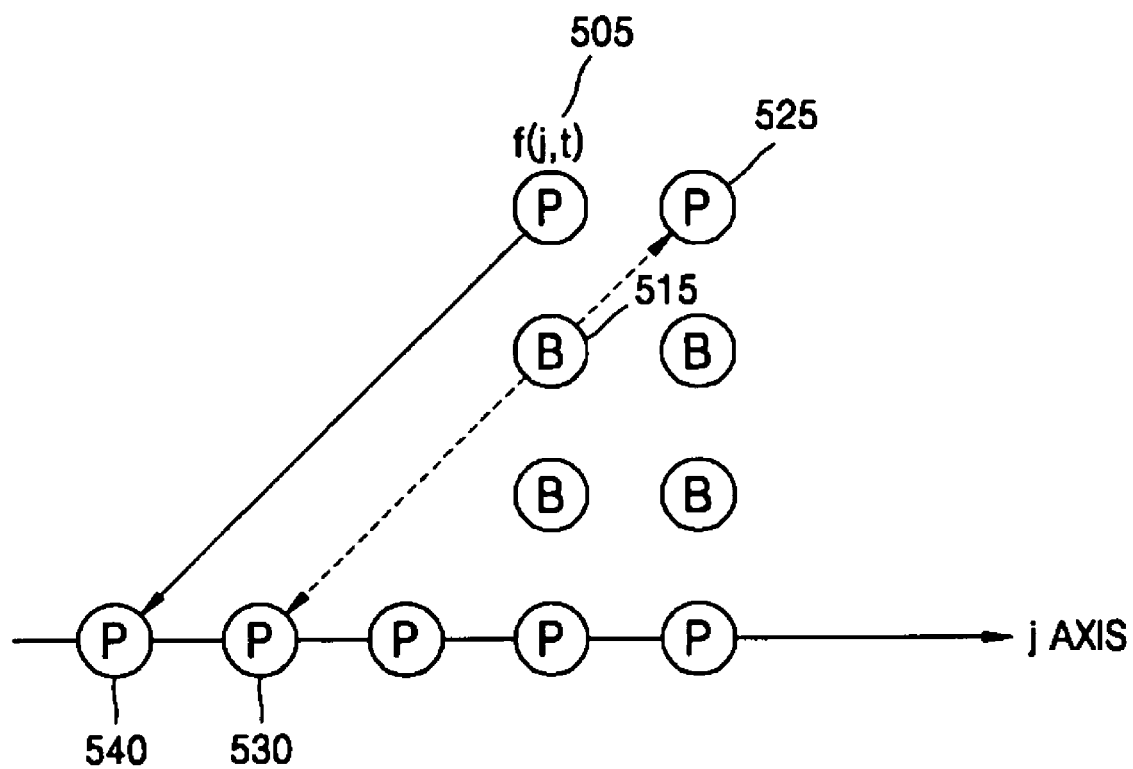
FIG. 5C is a graph illustrating direct prediction when a motion vector direction based on a change in camera distance to change in time $\Delta j/\Delta t$ of 1, according to an embodiment of the present invention.

According to still another embodiment of the present invention, FIG. 5C illustrates direct prediction when $\Delta j/\Delta t$ is 1. Referring to FIG. 5C, f(j,t) 505 makes reference to picture f(j-3,t-3) 540, taken by a (j-3)$^{th}$ camera. As illustrated can be thus seen that a picture to which the B picture 515 makes forward reference is f(j-2,t-3) 530.

Here, a forward motion vector $MV_F$ making reference to f(j-2,t-3) 530 may be given by Equation 6, below.

$$MV_F = MV_C \frac{TD_B}{TD_D} c_{f(j-2,t-3)} = R_F \quad \text{Equation 6}$$

Likewise, since the B picture 515 makes backward reference to f(j+1,t) 525, a backward motion vector $MV_B$ making reference to f(j+1,t) 525 may be given by Equation 7, below.

$$MV_{BI} = MV_C \frac{TD_B - TD_D}{TD_D} c_{f(j+1,t)} = R_B \qquad \text{Equation 7}$$

In Equations 2 through 7, $MV|_x$, e.g., $MV|_{f(j-1, t-3)}$, references a motion vector that makes reference to $f(j-1,t-3)$, again for example. In the foregoing examples, the weight can be varied case by case. For example, the weighting may be (0,1), (1, 0) instead of (3, 1), (1, 3). For example, the weight can be further defined by Equation 8, below.

$$c = \frac{c_p(TD_D - TD_B) + c_S TD_B}{TD_D} \qquad \text{Equation 8}$$

Here, $C_p$ can be the prediction block of a previous reference picture, and $C_s$ can be the prediction block of a subsequent reference picture. In the H.264 standard, each picture can have a plurality of reference frames. When each picture has five reference frames, the reference frames for $f(j,t)$ may be $f(j-1,t-3)$, $f(j,t-3)$, $f(j+1,t-3)$, $f(j,t-6)$, and $f(j,t-9)$, for example. Here, the method of predicting two-dimensional direct mode motion, according to an embodiment of the present invention, may be used only when $\Delta j/\Delta t$ is ⅓. When each picture has seven reference frames, the reference frames for $f(j,t)$ may be $f(j-2,t-3)$, $f(j-1,t-3)$, $f(j,t-3)$, $f(j+1,t-3)$, $f(j+2,t-3)$, $f(j,t-6)$, and $f(j,t-9)$, for example. Here, the method of predicting direct mode motion in a multi-angle moving picture, according to an embodiment of the present invention, may be used only when $\Delta j/\Delta t$ is ⅓, for example.

Figure 6:
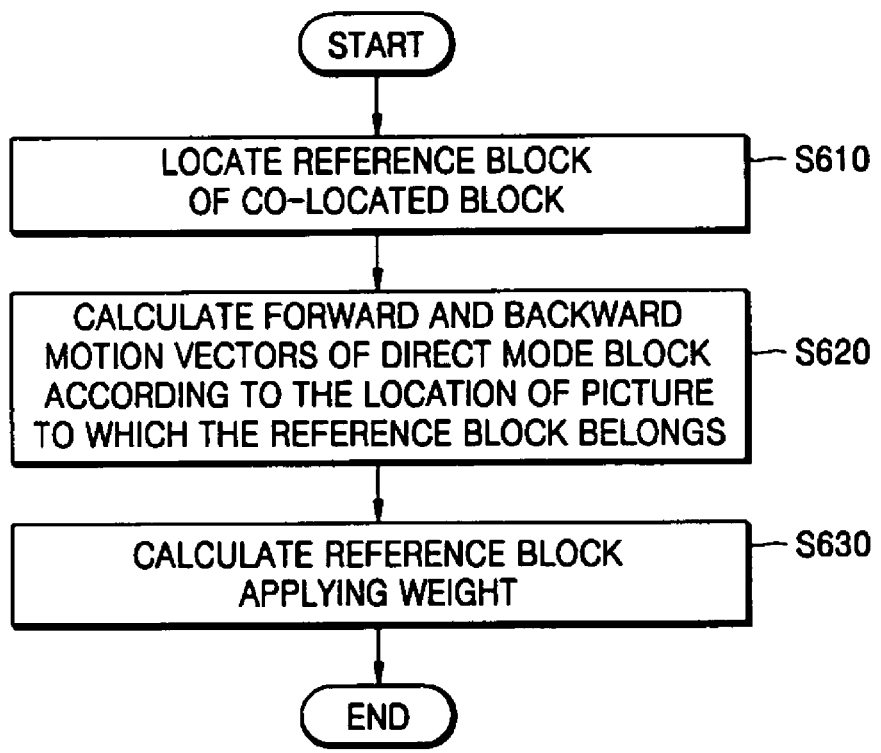
FIG. 6 illustrates a method of predicting direct mode motion of a multi-angle picture, according to an embodiment of the present invention.

FIG. 6 is a flowchart illustrating a method of predicting direct mode motion of a multi-angle moving picture, according to an embodiment of the present invention.

A block to which the co-located block of a block, for which coding is sought, makes reference with a motion vector can be located (operation 610). Where a reference picture to which the located block belongs is not taken by the same camera at the same location as the picture to which the block for which coding is sought belongs, a forward motion vector and a backward motion vector can be calculated by making reference to pictures of an adjacent camera that exists in the direction parallel to the direction corresponding to the motion vector (operation 620). Calculation of the forward motion vector and the backward motion vector varies depending on how far away the camera is from the camera that took the picture to which the block for which coding is sought belongs, which has been described with reference to FIGS. 5A through 5C, for example. When a reference picture is taken by a camera at the same location as the camera that took the picture to which the block for which coding is sought belongs, forward and backward motion vectors can also be calculated according to a conventional method of predicting direct mode motion, as described with reference to Equation 1, for example.

Forward and backward reference blocks of the block for which coding is sought are calculated by applying weights to the calculated motion vectors (operation 630).

Figure 7:
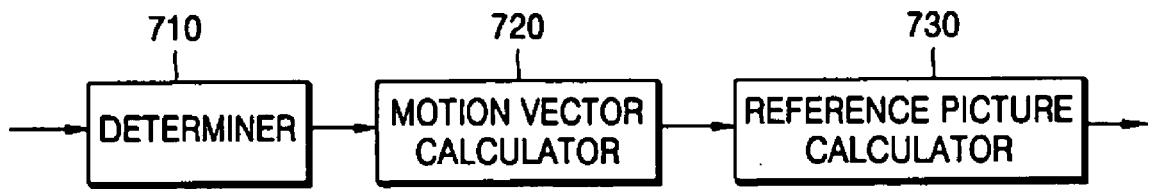
FIG. 7 is a block diagram within an apparatus for predicting direct mode motion of a multi-angle picture, according to an embodiment of the present invention.

FIG. 7 is a block diagram of an apparatus for predicting a direct mode motion of a multi-angle moving picture, according to an embodiment of the present invention.

Referring to FIG. 7, a determiner 710 can locate a block to which the co-located block of a block for which coding is sought makes reference with a motion vector. A motion vector calculator 720 can calculate forward and backward motion vectors. When a reference picture to which the located block belongs is not taken by the same camera as the picture to which the block for which coding is sought belongs, a forward motion vector and a backward motion vector can be calculated by making reference to pictures of an adjacent camera that exists in the direction parallel to the direction corresponding to the motion vector. Calculation of the forward motion vector and the backward motion vector depends on how far away the camera is from the camera that took the picture to which the block for which coding is sought belongs, which has been described with reference to FIGS. 5A through 5C, for example. When a reference picture is taken by a camera at the same location as the camera that took the picture to which the block for which coding is sought belongs, forward and backward motion vectors may be calculated according to a conventional method of predicting direct mode motion, as described with reference to Equation 1, for example.

A reference picture calculator 730 can calculate forward and backward reference blocks of the block for which coding is sought by applying weighting to the calculated motion vectors.

Embodiments of the present invention may also be embodied as computer readable code/instructions on a medium, e.g., computer readable recording medium. The medium may be any data storage device that can store/transfer data which can be thereafter read by a computer system. Examples of the medium/media can include read-only memory (ROM), random-access memory (RAM), CD-ROMs, magnetic tapes, floppy disks, optical data storage devices, and carrier waves, noting these are only examples. The medium can also be distributed network coupled computer systems so that the computer readable code is stored/transferred and executed in a distributed fashion. Also, functional programs, codes and code segments for implementing embodiments of the present invention can be easily construed by programmer skilled in the art to which the present invention pertains.

As described above, embodiments of the present invention can perform coding and decoding by locating motion vectors of previous and subsequent pictures without predicting motion, for example, thereby reducing the amount of calculation and performance time.

While the present invention has been particularly shown and described with reference to exemplary embodiments thereof, it will be understood by those skilled in the art that various changes in form and details may be made therein without departing from the spirit and scope of the invention as defined by the appended claims and their equivalents. The above embodiments should be considered in descriptive sense only and not for purposes of limitation.

What is claimed is:

1. A method of predicting direct mode motion of a block in a multi-angle moving picture, comprising:
    locating a block to which a co-located block, of the block for which coding is sought, makes reference with a motion vector;
    calculating a forward motion vector and/or a backward motion vector for the block for which coding is sought by making reference to a picture of an adjacent camera that exists in a direction parallel to a direction corresponding to the motion vector, when the reference picture is not taken by a same camera as a picture of the block for which coding is sought; and
    calculating forward and backward reference blocks of the block for which coding is sought by applying weighting to the calculated motion vectors.

2. The method of claim 1, wherein the block to which the co-located block makes reference with the motion vector is temporally previous to the co-located block and the block for which coding is sought.

3. The method of claim 1, wherein the co-located block is temporally subsequent to the block for which coding is sought.

4. The method of claim 1, wherein the calculating of the forward motion vector and/or the backward motion vector is performed, when the reference picture is taken by the same camera as the picture for the block for which coding is sought, by predicting direct mode motion according to:

$$MV_0 = \frac{TD_B}{TD_D} MV_C, \quad MV_1 = \frac{TD_D - TD_B}{TD_D} MV_C,$$

wherein $MV_C$ denotes the motion vector, $TD_B$ denotes a distance from a B picture, of the block for which coding is sought, to a P picture of the co-located block, and $TD_D$ denotes a distance from a P picture of the block to which the co-located block makes reference with the motion vector to the P picture of the co-located block.

5. The method of claim 1, wherein the weighting is based on how far the reference picture is away from the camera that took the picture of the block for which coding is sought.

6. The method of claim 1, wherein, when a P picture (f(j,t)) taken by a $j^{th}$ camera at a time t makes reference to a picture (f(j−1,t−3)) taken by a $(j−1)^{th}$ camera at a time t−3, and a picture to which a B picture taken immediately before the P picture makes forward reference exists between the picture taken by the $(j−1)^{th}$ camera at the time t−3 and a picture (f(j,t−3)) taken by the $j^{th}$ camera at the time t−3, the forward motion vector is given by:

$$MV_{F1} = MV_C \frac{TD_B}{TD_D} c_{f(j-1,t-3)}, \quad MV_{F2} = MV_C \frac{TD_B}{TD_D} c_{f(j,t-3)},$$

where $TD_B$ indicates a distance between the B picture and the picture taken by the $j^{th}$ camera at the time t−3, $TD_D$ indicates a distance between the P picture and the picture taken by the $j^{th}$ camera at the time t−3, $MV|_{f(j-1, t-3)}$ indicates a motion vector calculated by making reference to the picture taken by the j−1$^{th}$ camera at the time t−3 and C is a weight value, with reference pictures of the forward motion vectors $MV_{F1}$ and $MV_{F2}$ being $R_{F1}$ and $R_{F2}$, respectively, a forward reference picture is given by $R_F=(3R_{F1}+R_{F2}+2)/4$.

7. The method of claim 1, wherein, when a P picture (f(j,t)) taken by a $j^{th}$ camera at a time t makes reference to a picture (f(j−1,t−3)) taken by a $(j−1)^{th}$ camera at a time t−3, and a picture to which a B picture taken immediately before the P picture makes forward reference exists between the picture taken by the $(j−1)^{th}$ camera at the time t−3 and a picture (f(j,t−3)) taken by the $j^{th}$ camera at the time t−3, the backward motion vector is given by:

$$MV_{B1} = MV_C \frac{TD_B - TD_D}{TD_D} c_{f(j,t)}, \quad MV_{B2} = MV_C \frac{TD_B - TD_D}{TD_D} c_{f(j+1,t)},$$

where $TD_B$ indicates a distance between the B picture and the picture taken by the $j^{th}$ camera at the time t−3, $TD_D$ indicates a distance between the P picture and the picture taken by the $j^{th}$ camera at the time t−3, $MV|_{f(j, t)}$ indicates a motion vector calculated by making reference to the picture taken by the $j^{th}$ camera at the time t, and C is a weight value, with reference pictures of the backward motion vectors $MV_{B1}$ and $MV_{B2}$ being $R_{B1}$ and $R_{B2}$, respectively, a backward reference picture is given by $R_B=(3R_{B1}+R_{B2}+2)/4$.

8. An apparatus for predicting direct mode motion of a block a multi-angle moving picture, the apparatus comprising:
a determiner locating a block to which a co-located block, of the block for which coding is sought, makes reference with a motion vector;
a motion vector calculator calculating a forward motion vector and/or a backward motion vector for the block for which coding is sought by making reference to a picture of an adjacent camera that exists in a direction parallel to a direction corresponding to the motion vector, when a reference picture is not taken by a same camera as a picture of the block for which coding is sought; and
a reference picture calculator calculating forward and backward reference blocks of the block for which coding is sought by applying weighting to the calculated motion vectors.

9. The apparatus of claim 8, wherein the block to which the co-located block makes reference with the motion vector is temporally previous to the co-located block and the block for which coding is sought.

10. The method of claim 8, wherein the co-located block is temporally subsequent to the block for which coding is sought.

11. The apparatus of claim 8, wherein, when the reference picture is taken by the same camera as the picture for the block for which coding is sought, the motion vector calculator calculates motion vectors $MV_0$ and $MV_1$ by predicting direct mode motion according to:

$$MV_0 = \frac{TD_B}{TD_D} MV_C, \quad MV_1 = \frac{TD_D - TD_B}{TD_D} MV_C,$$

wherein $MV_C$ denotes the motion vector, $TD_B$ denotes a distance from a B picture, of the block for which coding is sought, to a P picture of the co-located block, and $TD_D$ denotes a distance from a P picture of the block to which the co-located block makes reference with the motion vector to the P picture of the co-located block.

12. The apparatus of claim 8, wherein the weighting is based on how far the reference picture is away from the camera that took the picture of the block for which coding is sought.

13. The apparatus of claim 8, wherein the apparatus is a coding and/or decoding apparatus coding and/or decoding the moving picture.

14. The apparatus of claim 13, wherein the coding and/or decoding apparatus corresponds to 3-dimensional video coding/decoding.

15. At least one non-transitory medium comprising computer readable code/instructions implementing the method of claim 1.

16. At least one non-transitory medium comprising computer readable code/instructions implementing the method of claim 6.

17. At least one non-transitory medium comprising computer readable code/instructions implementing the method of claim 7.

* * * * *

UNITED STATES PATENT AND TRADEMARK OFFICE
CERTIFICATE OF CORRECTION

| | | |
|---|---|---|
| PATENT NO. | : 7,876,828 B2 | Page 1 of 1 |
| APPLICATION NO. | : 11/191930 | |
| DATED | : January 25, 2011 | |
| INVENTOR(S) | : Yung-lyul Lee et al. | |

It is certified that error appears in the above-identified patent and that said Letters Patent is hereby corrected as shown below:

Column 9, Line 35-39, In Claim 6, delete

" $MV_{F1} = MV_C \dfrac{TD_B}{TD_D} \, c \, f(j-1,t-3)$, $MV_{F2} = MV_C \dfrac{TD_B}{TD_D} \, c \, f(j,t-3)$ " and Insert -- $MV_{F1} = MV_C \dfrac{TD_B}{TD_D} \, c \, f(j-1,t-3)$, $MV_{F2} = MV_C \dfrac{TD_B}{TD_D} \, c \, f(j,t-3)$ --, therefor.

Column 9, Line 58-62 (Approx.), In Claim 7, delete

" $MV_{B1} = MV_C \dfrac{TD_B - TD_D}{TD_D} \, c \, f(j,t)$, $MV_{B2} = MV_C \dfrac{TD_B - TD_D}{TD_D} \, c \, f(j+1,t)$ " and Insert -- $MV_{B1} = MV_C \dfrac{TD_B - TD_D}{TD_D} \, c \, f(j,t)$, $MV_{B2} = MV_C \dfrac{TD_B - TD_D}{TD_D} \, c \, f(j+1,t)$ --, therefor.

Signed and Sealed this

Nineteenth Day of June, 2012

David J. Kappos
*Director of the United States Patent and Trademark Office*